July 21, 1925.
J. J. MASCUCH
1,547,058
AUTOMOBILE BUMPER
Filed April 1, 1925
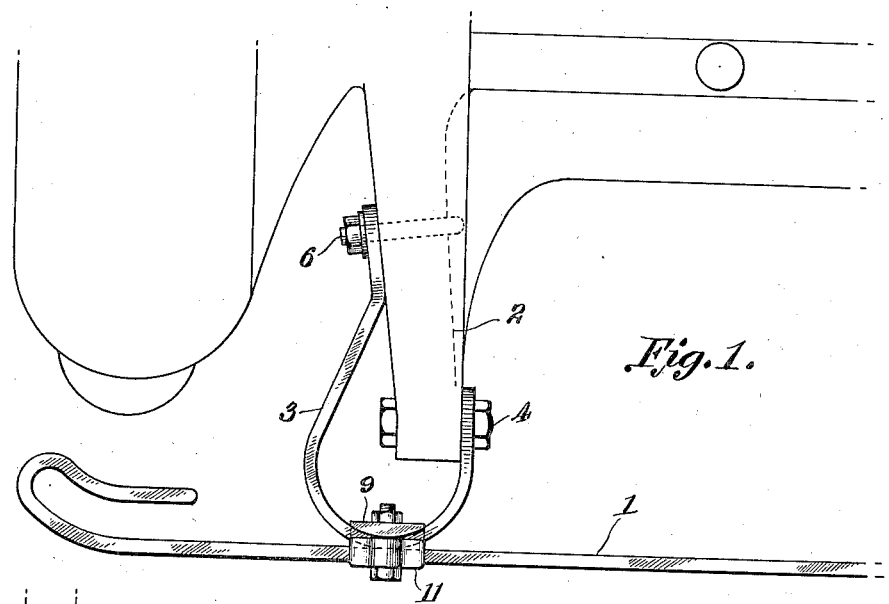
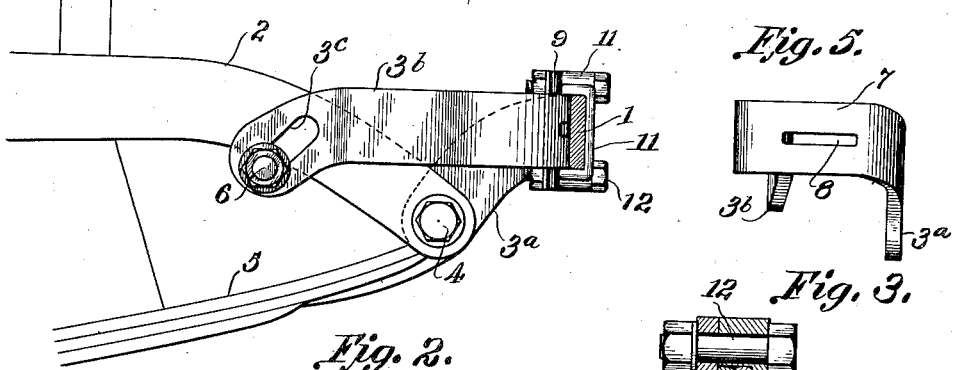
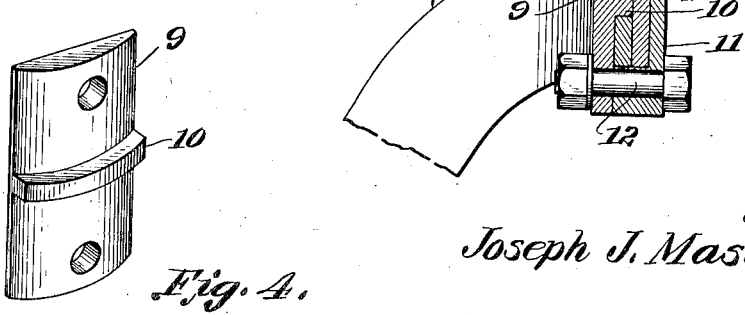
Inventor
Joseph J. Mascuch.
By Mason Fenwick & Lawrence
Attorneys Patented July 21, 1925.

1,547,058

UNITED STATES PATENT OFFICE.

JOSEPH J. MASCUCH, OF EAST ORANGE, NEW JERSEY.

AUTOMOBILE BUMPER.

Application filed April 1, 1925. Serial No. 19,909.

*To all whom it may concern:*

Be it known that I, JOSEPH J. MASCUCH, a citizen of the United States, residing at East Orange, in the county of Essex and State of New Jersey, have invented certain new and useful Improvements in Automobile Bumpers; and I do hereby declare the following to be a full, clear, and exact description of the invention, such as will enable others skilled in the art to which it appertains to make and use the same.

This invention relates to improvements in means for securing automobile bumpers to the frame of an automobile. The bracket is a looped member, the ends of which are adapted to be suitably secured to an automobile frame, and the loop of the bracket is provided with a slot which is adapted to cooperate with a clamping plate having a rib adapted to enter the slot. A saddle-like block cooperates with the clamping plate to hold the bumper to the bracket in a manner which will be more fully explained hereinafter.

In the drawings, Figure 1 is a fragmentary plan view showing the manner of attaching the bracket to the automobile and the bumper to the bracket;

Fig. 2 is a side elevation of Fig. 1;

Fig. 3 is a vertical section taken through the improved bracket and bumper;

Fig. 4 is a perspective view of the back clamping plate, and

Fig. 5 is a front elevation of the improved bracket.

In the drawings, numeral 1 indicates a single bar bumper of any improved type, but the same may also be considered as representing the back bar of a bumper; numeral 2 indicates generally one side of the frame of an automobile; and 3 the improved bracket adapted to be secured to the automobile frame, and to which the bumper or back bar 1 is secured.

The bracket 3 is preferably a looped member having its legs $3^a$ and $3^b$ of unequal length. The short leg $3^a$ is bent downward and has a perforation through its end, said short leg being adapted to be secured to the frame of the automobile by means of the pintle 4, which secures the automobile spring 5 to the frame 2. The long leg $3^b$ of the bracket has a slot $3^c$ arranged at an angle, and the end of the said leg is preferably bent at an angle in conformity with the slot $3^c$. The said long leg of the bracket is secured to the automobile frame by means of hooked bolt 6, adapted to hook over one of the flanges of the automobile frame. The angular slot $3^c$ in the long leg $3^b$ permits the bracket to be tilted so as to enable the face of the bracket to be positioned in a vertical plane.

The face of the bracket is indicated at 7, and the same has a horizontally extending slot 8. The bumper bar 1 is adapted to lie flush against the face 7, and to be held thereagainst by the novel clamping means now to be described. A clamping plate 9, having a convex face is adapted to be seated within the looped part of the bracket, this plate having a rib 10 adapted to be received within the slot 8 in the face 7 of the bracket. The rib 10 serves to hold the plate 9 from displacement within the bracket. Adapted to cooperate with the plate 9 for holding the bar 1 in position against the face of the bracket is a saddle block 11, of a depth to receive the bar 1 and the face 7 of the bracket. Bolt holes extend through the ends of the saddle and also through the ends of the plate 9 for the reception of bolts 12 which secure the saddle block and plate in fixed relation. It will now be seen that the clamping device consists essentially of the plate 9 and the saddle block 11, together with the bolts 12 which secure the same in fixed relation.

The described manner of securing the bumper bar to the bracket permits the bar to be held in a firm manner without the necessity of clamping the bar tightly against the face of the bracket. This manner of holding the bar is an advantage because it allows the same to have some relative movement with respect to the bracket if the bar is flexed by impact. The clamping means is simple and efficient in use and there is no danger of the same becoming broken or damaged in case of impact or collision.

By making the bracket of substantially U-form in plan and providing the slot $3^c$ in one of the legs thereof, the bracket can be readily tilted or swung on the bolt 4, which secures the one end of the bracket to the automobile frame.

What is claimed is:

1. The combination with a bar of an automobile bumper, of a looped bracket against the loop of which the bar is adapted to be secured, a clamp for securing the bar to the bracket consisting of a saddle block of a depth to receive the said bar and to extend over the bracket, a clamping plate adapted to seat within the loop of the bracket and bolts securing the plate and saddle in rigid relation.

2. The combination with an automobile bumper having a bar extending transversely of the bumper, a looped bracket to the loop of which the bar is adapted to be secured, clamping means for securing the bar to the bracket consisting of a clamping plate adapted to seat within the loop of the bracket, said plate having a rib adapted to enter a slot in said bracket, a saddle block of a depth to receive the bumper bar and to extend over the looped part of the bracket, and bolts rigidly securing the saddle and plate in fixed relation.

3. The combination of a looped bracket, a bumper bar adapted to be secured against the outer face of the loop, means for holding the said bar in a definite relation with respect to said bracket, comprising the saddle block of a depth to receive the bumper bar and to extend over the looped part of the bracket, said bracket having a horizontally extending slot at its loop, a plate having a rib adapted to enter the slot in said bracket, said plate having a contour complementary to that of the inside face of the loop, and bolts securing the plate and saddle in fixed relation.

In testimony whereof I affix my signature.

JOSEPH J. MASCUCH.